Figure 1:
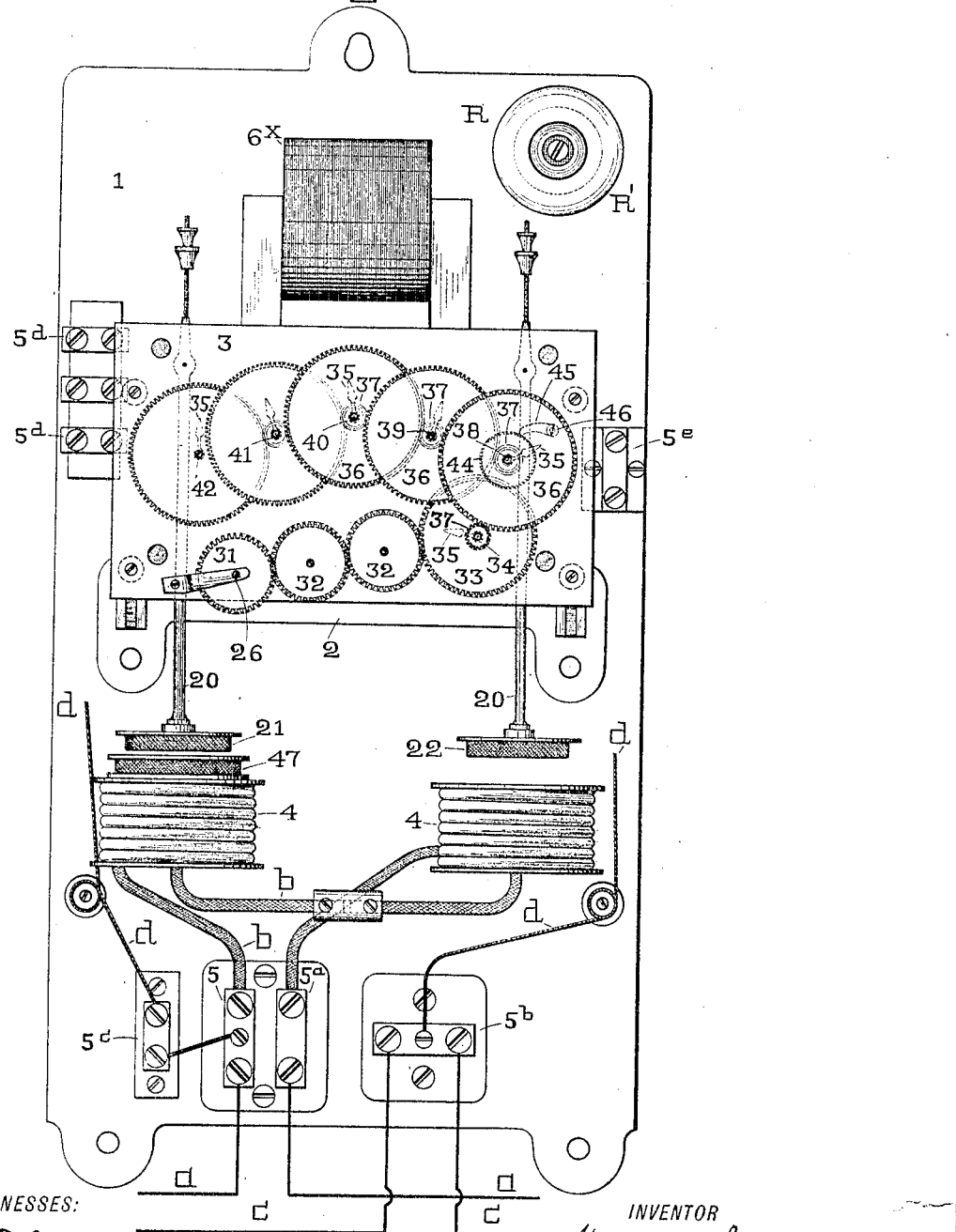

No. 813,685. PATENTED FEB. 27, 1906.
H. ARON.
ELECTRICITY METER.
APPLICATION FILED JAN. 13, 1904.
2 SHEETS—SHEET 2.
Fig. 2
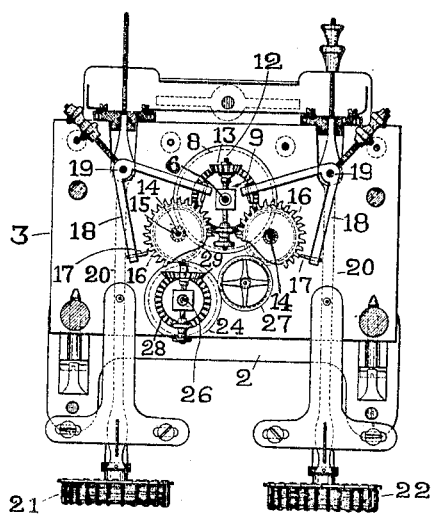
Fig. 3
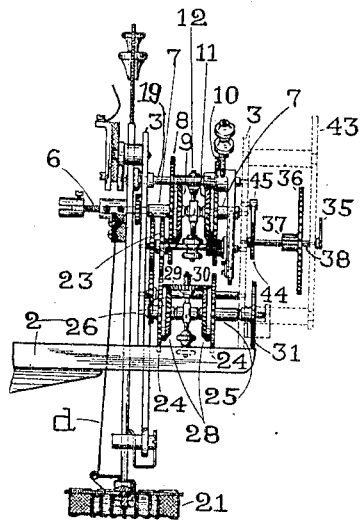
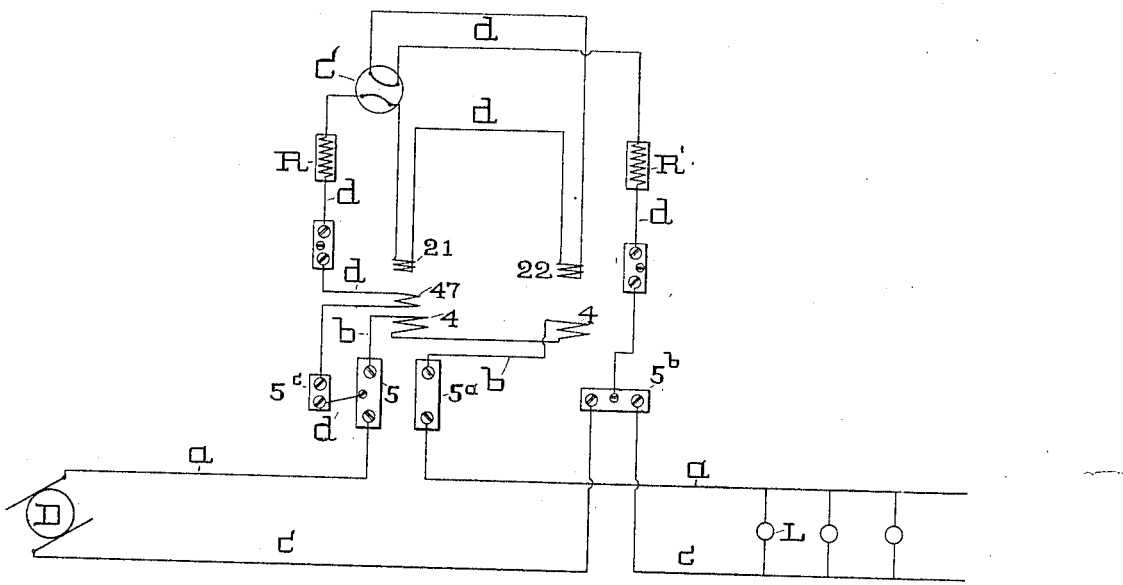
Fig. 4
WITNESSES:
Joseph F. Jaquith
John A. Quick
INVENTOR
Hermann Aron,
BY
Henry J. Miller
his ATTORNEY

UNITED STATES PATENT OFFICE.

HERMANN ARON, OF CHARLOTTENBURG, GERMANY.

ELECTRICITY-METER.

No. 813,685.  Specification of Letters Patent.  Patented Feb. 27, 1906.

Application filed January 13, 1904. Serial No. 188,849.

*To all whom it may concern:*

Be it known that I, HERMANN ARON, a citizen of the Empire of Germany, residing at 39 Wilmersdorferstrasse, Charlottenburg, in the Kingdom of Prussia and Empire of Germany, have invented certain new and useful Improvements in Electricity-Meters, of which the following is a specification.

My invention relates particularly to differential clockwork electric meters of the type commercially known as the "Aron electricity-meter," comprising a frame or casing for supporting the various parts of the mechanism and their electrical connections, automatically-actuated electrical winding mechanism for periodically winding up the spring-actuated clockwork mechanism comprising the two independent trains of transmission-gearing, each having an escapement controlled in its operation by a pendulum and connected with common recording devices and periodically-acting current and gearing reversing devices for insuring a continuous recording action of the instrument, while compensating for slight mechanical variations in the differential transmission-trains by subjecting them to the effects of the electric currents passed through the coils in opposite directions, the two pendula carrying small shunt-coils of opposite polarity swinging to and fro adjacent the main coils in the load-circuit, by the influence of which they are respectively retarded and accelerated with corresponding effect upon the transmission-trains controlled by the pendula. Notwithstanding the periodical reversal of the electrical conditions governing the vibrations of the pendula, as described, in order to compensate while the instrument is in effective operation for slight mechanical defects in the mechanism, it has been found in practice that the removal of electrical influence from the pendula by arrest of the flow of current through the main coils has permitted the pendula to vibrate under the sole influence of gravity and of the actuating-spring of the clockwork with unequal frequency, whereby the recording mechanism was still permitted to operate either forwardly or backwardly proportionately to such vibrations in frequency, thereby rendering the readings of the instrument inaccurate, especially when the connected load-circuit was idle for any considerable time.

The object of the present invention is to counteract any tendency of an electrical instrument of this nature to record under mere mechanical conditions uninfluenced by passage of current in the main or load circuit; and to this end the invention consists, essentially, in the combination, with recording mechanism comprising a regulator controlled electromagnetically in its action by current passing through the load-circuit, of means for automatically assuming control of the recording mechanism when the flow of current through the load-circuit ceases. While the control of the meter during the interruption of the flow of "useful" current through the same may evidently be performed solely by mechanical means, I prefer to effect this control in part electromagnetically, as by the employment of an auxiliary shunt magnet coil adjacent one of the main magnet-coils and of reverse polarity, of such limited power that its influence upon its respective pendulum magnet-coil is readily overcome by that of the main magnet during the passage of useful current through the instrument; but while the latter is interrupted the continued magnetic influence of such auxiliary coil is such as to induce a reverse operation of the recording mechanism, which is opposed by a ratchet device with which I provide such recording mechanism, which under such condition becomes positively locked from retrograde movement and electrically prevented from forward movement, and is therefore held stationary until flow of current in the main or load circuit is resumed.

The invention will be understood by reference to the accompanying drawings, in which—

Figure 1 is a front view of an electric meter embodying my present improvement with the front of the casing and the dial-plate removed to expose the parts immediately behind the same. Fig. 2 is a front view, and Fig. 3 an edge view, of the clockwork portion of the instrument, illustrating the differential transmission-gearing with its escapement devices. Fig. 4 is a diagram showing the motor and connected main and shunt circuits through an instrument constructed as represented in the preceeding figures.

As indicated in Fig. 1, the base-plate 1 of the instrument is provided with a supporting-bracket 2, carrying the frame 3 of the clockwork, and with the fixed spools for the main-circuit magnet-coils 4 and with the various connection-blocks 5 5ª 5ᵇ 5ᶜ, &c.

The clockwork mechanism comprises the spring-actuated rotary spindle 6, which is in practice driven by the electrically-actuated winding mechanism comprising the electromagnet $6^x$, (shown in Fig. 1,) forming the subject of my United States Patent No. 700,597, dated May 20, 1902, the spring being kept continuously under tension through a connection of its winding mechanism with a shunt-circuit from the line conductor. This spindle carries two loose sleeves 7, the one being provided with a spur-wheel 8 and bevel-wheel 9 and the other with a spur-wheel 10 and bevel-wheel 11 and the spindle being provided intermediate the bevel-wheels 9 and 11 with a fixed radial arm 12, carrying the bevel planet-wheel 13, loosely mounted thereon and meshing with the bevel-wheels 9 and 11. Each of the cog-wheels 8 and 10 meshes with a pinion 14, mounted upon a spindle 15, carrying the escapement-wheel 16, controlled in its rotation by the teeth 17 of the forked escapement-lever 18, mounted upon the rock-shaft 19, from which depends the pendulum-rod 20. The pendulum-rods carry at their lower ends the shunt magnet-coils 21 and 22, respectively.

The spindles 15 are connected by means of the cog-wheels 23 with the cog-wheels 24, carried by a loose sleeves 25, mounted upon the spindle 26, the one directly and the other through an intermediate gear 27, and each of the sleeves 25 carries a bevel-gear 28, meshing with a bevel planet-gear 29, mounted upon a fixed radial arm 30, with which the spindle 26 is provided, whereby motions from the spindles 15 are transmitted to the bevel-gears 28 in opposite directions, and when such motions are equal they will result in the mere rotation of the planet-wheel 29 without communicating thereto bodily circular motion, while any difference of such communicated motion to the gears 24 and 28 will cause simultaneous rotating and revolving movements of the planet-gear 29 upon the fixed arm 30, with a resultant rotation of the spindle 26.

The outer end portion of the spindle 26 carries a cog-wheel 31, which is connected through the intermediate cog-wheels 32 with the cog-wheel 33 upon the spindle 34 with a primary indicating-hand 35 acting in conjunction with one of the usual dials to afford the readings of the lowest denomination. The primary spindle 34 is connected in the usual manner by means of a train of intermeshing-gears 36 and 37 with the series of pointer-spindles 38, 39, 40, 41, and 42, each provided, as indicated in dotted lines in Fig. 1, with a suitable hand or pointer 35 for operation in conjunction with its respective dial upon the outer face of the dial-plate 43.

As indicated in Fig. 1, the spindle 38 carries a fixed ratchet-wheel 44, of which the peripheral teeth are continuously engaged by a pawl 45, (shown in dotted lines in Fig. 1,) pivoted by means of a screw 46 upon the forward face of the intermediate frame-plate 3 behind the cog-wheels 36 and 37 of the said spindle. The teeth of this ratchet-wheel and coöperating pawl are so disposed that the spindle 38 is permitted to turn freely in the forward direction, but is prevented from retrograde movement so as to insure against the negative movement and registration of the train of recording mechanism.

The spool of the main magnet-coil 4 at the left in Fig. 1 is shown provided with an auxiliary shunt magnet-coil 47, disposed in axial arrangement therewith adjacent to the path of oscillation of the shunt-coils 21 of the pendula 20.

In practice the primary magnet-coils 4 are similarly wound, so as to produce like polarity in the same, and the auxiliary shunt magnet-coil 47 is so wound as to produce a reverse polarity from that of the adjacent main magnet-coil, while the pendulum shunt magnet-coils are reversely wound, so as to produce opposite polarity therein.

As so constructed the parts are connected with the main circuit, as follows: The main circuit is from one of the terminals of the generator D through the line-wire $a$ to the connection-block 5, thence by the connecting-wires $b$ through the main magnet-coils 4, arranged in series to the adjacent connection-block $5^a$, thence through the light-circuits, indicated herein as containing electric lights L, and thence by the return-wire $c$ to the other generator terminal. The shunt-circuit forms a branch of the main circuit $a$ at the block 5, whence it is led by means of the wire $d$ to the connection-block $5^c$, thence through the auxiliary coil 47 and the resistance R to the commutator C, thence through the pendulum magnet-coils 41 and 22 and back through the commutator and through the resistance R′ to the block $5^b$, through which it is connected with the return-wire $c$ to complete the shunt-circuit.

In the use of the instrument, the generator D having been set in operation, the winding mechanism for the spindle 6 is operated to provide the necessary torsion for the spindle 6, which, through the escapement or regulating device formed by the toothed wheels 16 and forked levers 18, operate to set the pendula 20 in vibration with equal frequency, each of the escapement devices being substantially a counterpart of the other. Connections being made between the positive and negative conductors $a$ and $c$ of the motor-circuit through the main magnet-coils 4 and the circuits of the lamps L and being formed continuously through the shunt-circuit $d$, the operation of the magnetism developed in the main coils 4 upon the shunt-coils 21 and 22 of the pendula is to accelerate the vibrations of one and to retard the vibrations of the other, thereby creating differential action between the escapement devices and inducing a resultant rotation of the spindle 26, which is communicated to the train of indicating-gearing in a positive or forward direction. So long as the load remains in the main circuit this action continues, the magnetic influence of the left-hand magnet-coils 4 overcoming the negative influence of the auxiliary shunt-coil 47. As soon, however, as the load is removed from the main circuit, and the latter thus becomes open, the shunt-circuit becomes the only one to influence the recording mechanism of the instrument, and this in a backward direction, due to the reverse winding of the auxiliary shunt-coil 47 in respect of the adjacent main coil 4, thus initiating a backward-recording motion to the train of indicating-gearing. This action is checked almost immediately by the positive engagement of the pawl 45 with a tooth of the ratchet-wheel 44, the mechanism becoming locked and so remaining until the main circuit is again closed by the application of a load, such as the lamps indicated in Fig. 4. It is evident that the locking of a member of this mechanism from rotation under the impulse of the spring-actuated shaft 6 serves to remove the influence of the latter upon the pendula tending to maintain them in operation, whereby the operation of the entire mechanism of the meter becomes arrested and so remains until flow of current in the main circuit is renewed and the influence of the magnet-coil 47 thus overcome to permit the normal operation of the meter.

While the instrument above described as actually placed upon the market is provided with a commutator, as C, and with means connected therewith for reversing the train of indicating-gearing simultaneously with the reversal of current in the shunt-circuit $d$, such devices are not specifically shown and described herein, as they form no part of the present improvement, the armature of the commutator being properly allowed to remain stationary, and thereby afford fixed connections for the shunt-circuit for the purposes of the present invention.

Although the resistances R and R' are shown for convenience in Fig. 4 as separated by nearly the width of the instrument, in practice they are contained by a single spool, (designated in Fig. 1 by R R'.)

From the foregoing description it will be observed that the present improvement is not limited to the details of construction and arrangement herein specifically set forth and that it may be embodied in apparatus differing materially in constructive features and arrangement of parts.

While I prefer to employ an auxiliary shunt-coil as the permanently or continuously energized device for acting upon the shunt-coils carried by the pendula in opposition to the primary magnet-coils, it will be evident that the present invention is not limited to the particular means herein shown and described for producing the tendency of the recording mechanism to retrograde movement in opposition to the stop device (shown herein as a ratchet and pawl) when the current ceases to flow through the primary magnet-coils.

What I claim is—

1. In an electric meter, the combination with recording mechanism comprising a regulator electromagnetically controlled in its action by current passing through the main circuit, of means acting automatically when the flow of current through the main circuit is interrupted for inducing a retrograde movement of said recording mechanism, and means independent thereof for detaining the same against such retrograde movement.

2. In an electric meter, the combination with the recording mechanism comprising a regulator electromagnetically controlled in its action by current passing through the main circuit, of continuously-energized means for automatically assuming control of the recording mechanism when the flow of current through the main circuit is interrupted.

3. In an electric meter, the combination with recording mechanism comprising an electromagnetically-controlled regulator, a main magnet-coil connected with the main circuit from the source of current-supply and acting upon said regulator, and an auxiliary magnet-coil also acting upon said regulator and connected with a shunt-circuit from the source of current-supply.

4. In an electric meter, the combination with the recording mechanism, comprising an electromagnetically-controlled regulator, a main magnet-coil connected with the main circuit from the source of current-supply and acting upon said regulator to control the recording action of said mechanism, an auxiliary magnet-coil acting upon said regulator in opposition to said main magnet-coil, and means for locking said mechanism against retrograde motion under the action of the auxiliary magnet-coil when the flow of current is interrupted through the main magnet-coil.

5. In an electric meter, the combination with the recording mechanism, comprising a train of gearing and an electromagnetically-controlled regulator therefor, a main magnet-coil connected with the main circuit from the source of current-supply and acting upon said regulator to control the recording action of said mechanism, means applied to one of the members of the said train of recording mechanism for locking the same from retrograde movement, and means automatically brought into effective action by the interruption of the flow of current in the main circuit for bringing said locking means into operation.

6. In an electric meter, the combination with the recording mechanism, comprising a train of gearing and an electromagnetically-controlled regulator therefor, a main magnet-coil connected with the main circuit from the source of current-supply and acting upon said regulator to control the recording action of said mechanism, means for mechanically preventing the retrograde movement of said recording mechanism, and means for electrically preventing the forward movement of said recording mechanism when the flow of current in the main circuit is interrupted.

7. In an electric meter, the combination with the recording mechanism, comprising two differential trains of transmission-gearing and a common train of indicating-gearing connected therewith, regulators or escapements for each said train of differential gearing, a pair of main magnet-coils of like polarity each disposed adjacent to one of the said regulators and connected with the main circuit from the source of current-supply, magnet-coils of opposite polarity carried by said regulators, and each connected with a shunt-circuit from said source of current-supply, means applied to said train of indicating mechanism for mechanically locking the same from retrograde movement, and an auxiliary magnet-coil of opposite polarity disposed in juxtaposition to one of said main magnet-coils and also connected with the said shunt-circuit from the source of current-supply.

8. In an electric meter, the combination with a fixed main magnet-coil in the main circuit from the source of current-supply, a primary shunt magnet-coil in a shunt-circuit, a movable member carrying said shunt magnet-coil which is magnetically actuated under the influence of said main magnet-coil, and a train of clockwork recording mechanism connected with said movable member, of a fixed auxiliary shunt magnet-coil of less strength than said main coil and of opposite polarity in respect of the same, and a stop device applied to the recording mechanism for opposing its operation under the action of the auxiliary shunt magnet-coil when the flow of current in the main coil is interrupted.

9. In an electric meter, the combination with a fixed main magnet-coil in the main circuit from the source of current-supply, a primary shunt magnet-coil in a shunt-circuit, a movable member carrying said shunt magnet-coil which is magnetically actuated under the influence of said main magnet-coil, and a train of clockwork recording mechanism connected with said movable member, of a fixed auxiliary shunt-coil of less strength than said main coil and of opposite polarity, and a ratchet and pawl applied to a member of the train of recording mechanism and so disposed as to permit its operation under the influence of the main coil but to resist its reverse movement under the sole action of the auxiliary shunt magnet-coil.

10. In an electric meter, the combination with two main coils in the main circuit from the source of current-supply and two primary shunt magnet-coils, two pendula each carrying one of said shunt magnet-coils, which are each magnetically actuated under the influence of its respective main magnet-coil, and recording mechanism comprising two differentially-acting trains of mechanism each connected with and controlled by one of said pendula, of an auxiliary shunt magnet-coil adjacent one of said main magnet-coils and of opposite polarity, and a stop device applied to said recording mechanism for opposing its operation under the sole action of the auxiliary shunt-coil when the main coil is inactive.

In witness whereof I have hereunto set my hand in presence of two witnesses.

HERMANN ARON.

Witnesses:
  HENRY HASPER,
  WOLDEMAR HAUPT.